E. B. JACOBSON.
METHOD OF CHARGING SECONDARY BATTERIES.
APPLICATION FILED DEC. 3, 1913.
1,227,149.
Patented May 22, 1917.
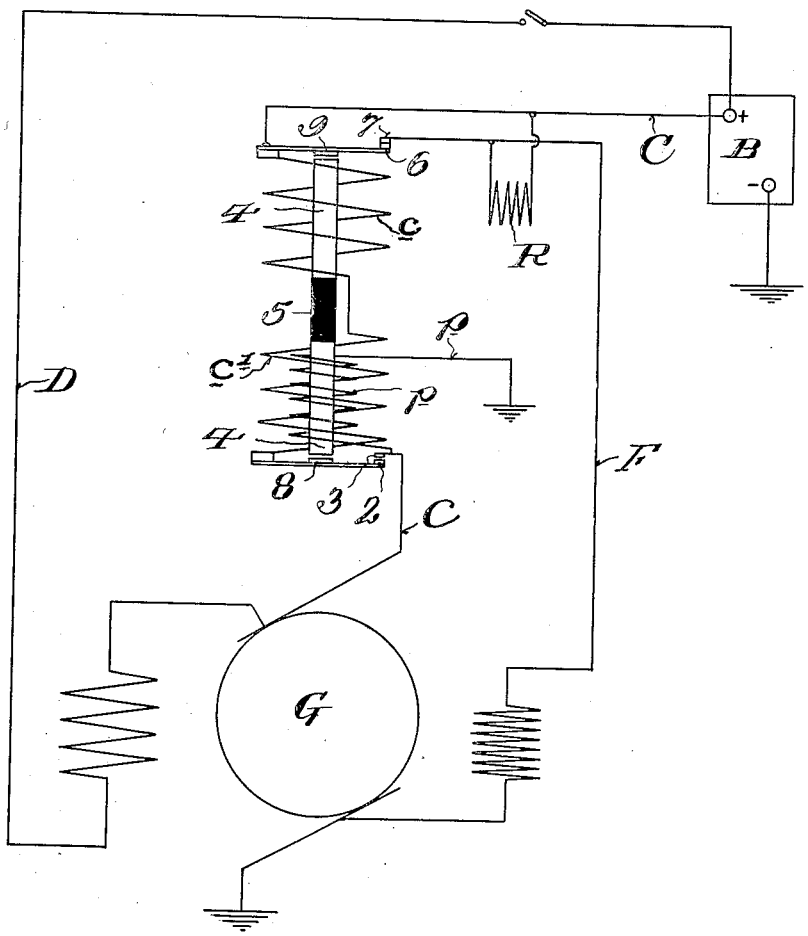
Witnesses
Inventor
Edward B. Jacobson
By Sturtevant & Mason
Attorneys

UNITED STATES PATENT OFFICE.

EDWARD B. JACOBSON, OF PITTSFIELD, MASSACHUSETTS, ASSIGNOR TO HENDEE MANUFACTURING COMPANY, OF SPRINGFIELD, MASSACHUSETTS, A CORPORATION OF MASSACHUSETTS.

METHOD OF CHARGING SECONDARY BATTERIES.

1,227,149.   Specification of Letters Patent.   Patented May 22, 1917.

Application filed December 3, 1913. Serial No. 804,530.

*To all whom it may concern:*

Be it known that I, EDWARD B. JACOBSON, a citizen of the United States, residing at Pittsfield, in the county of Berkshire, State of Massachusetts, have invented certain new and useful Improvements in Methods of Charging Secondary Batteries, of which the following is a description, reference being had to the accompanying drawing and to the figures of reference marked thereon.

My invention relates to the method of charging secondary batteries and has for its principal object the charging of batteries in such manner that their operation and the operation of the apparatus connected with them are substantially "fool proof."

It is a well known fact that the proper charging and care of storage batteries has heretofore required very skilful attention. Where batteries have been used in large units as for instance upon electric vehicles of the various types, and charging stations of considerable size have been provided, it has been possible for electricians and owners of cars to give this attention. In the usual case more than one set of batteries is provided, and one is used while the other is being charged. In the case of small batteries for lighting and starting of machines run by hydrocarbon engines however, the batteries are very much smaller, so small that the skilful care and automatic apparatus used in their charging becomes too great an expense to be maintained by the individual owner. It is to meet the demand for a satisfactory "fool proof" method of charging these small units, and particularly to meet the demand for such a method for use upon motor cycles and vehicles of like type that my invention has been made.

On vehicles of the character of motor cycles, the available space for apparatus is very limited and furthermore the vehicle is used under conditions much more extreme than are the average vehicles of the four wheel type. Still further these vehicles cost so little and are so light in weight as not to warrant the provision of extra batteries and complicated apparatus. As will be seen, my improved method of charging not only enables a single battery to be continuously used, but also enables it to be charged and maintained charged by the most careless without damage and with a minimum weight of appurtenant apparatus.

My improved method of charging batteries consists in applying to the secondary battery from the charging generator or other suitable source for an indeterminate period and virtually continually, and irrespective of the condition of the battery, a charging current of a value too small to result in harmful effect upon the battery when the application is continued after the battery has become fully charged. Preferably this current is of a pulsating character, the pulses of which have a substantially uniform maximum value and are separated by an appreciable time interval, whereby the heat generated by the passage of such current through the battery after the battery has become fully charged is insufficient to tax the capacity of radiation of the battery or to raise its temperature substantially above its normal operating temperature.

My invention may be best understood from a preliminary description of the apparatus by which the same is carried into use, and accordingly I have illustrated such apparatus on the accompanying sheet of drawings.

Referring to the drawings, G is a generator of the direct current types, capable of use as a motor in the well-known manner. B is a secondary battery to be charged. The negative pole of the generator is connected normally to the negative pole of the battery through the ground connection indicated or through any suitable conductor. From the positive pole of the generator to the positive pole of the battery extends a conductor C which as shown is normally open at contacts 2, 3. These contacts are a part of a regulator R.

The regulator R comprises a coil $c$ in series with the conductor C and wound upon a core 4. The core 4 is made in two sections separated by suitable non-magnetic material 5. On the opposite end of the core 4 from the coil $c$ is a second coil $c'$ also in series with conductor C, and wound in the same direction upon the core as coil $c$, and in addition a potential coil $p$ connected across the terminals of the generator G. Coil $c'$ normally acts in the same direction as coil $p$. The contacts 2, 3 referred to are mounted at this end of the core. At the opposite end of the core are mounted normally closed contacts 6, 7 in the shunt field F of the generator. Both the contacts 2 and 6 are movable contacts and are carried on suitable armatures 8, 9. Armature 9 may be polarized. When the coils of the regulator R are deënergized, the contacts 2 and 6 are retracted by their resiliency or by the resiliency of connected springs.

The generator G is also provided with a series field winding S connected between the positive pole of the generator and the positive pole of the battery by means of a conductor D.

The method of my invention is carried out by this apparatus as follows: The generator G is driven from the hydrocarbon motor of the vehicle by any suitable connection, with or without intermediate gearing, and when so driven, charges the storage battery B over the conductor C. When the hydrocarbon motor is at rest however it may be started by using the generator as a motor, the generator G being supplied with power over the conductor D and turning the engine over sufficiently to start it. In the first case when the batteries are being charged, the shunt field F is used, whereas when the engine is being started, the generator being used as a motor, the series field S is used. The engine having been started and the generator G operating as such, as soon as the voltage of the generator rises to such a value that the potential coil $p$ draws its armature 8 and contact 2 up, the circuit C between the generator and batteries B is closed at contacts 2, 3, and charging current flows to the battery, the potential at which the coil $p$ acts being above that of the battery sufficiently to prevent reverse current. The maximum value of the charging current is determined by the series coil $c$ which attracts its armature and contact 6 as soon as the current reaches a determinate maximum value. This opens the shunt field circuit at contacts 6 and 7 (the resistance R is bridged across the contacts to prevent sparking) and immediately the voltage of the generator begins to fall, and with it the current in the conductor C, until the current becomes too weak to hold the contacts 6, 7 separate whereupon these contacts again close, and the generator voltage rises quickly to its former value, the shunt field building up as the voltage rises, whereupon the current having again reached the determinate value at which contact 6 is operated, the field F is again broken, and so on.

There is thus a pulsating or intermittent charging current supplied the battery over the conductor C. The proportions of the series coil $c$ are made such that the value of this charging current, and the total quantity of current applied to the battery during any given period of time are too small to effect harm to the battery in case continued after the battery has become fully charged. In other words, the total quantity of charging current applied in any given time is too small to tax the capacity of radiation of the battery, and to substantially increase its operating temperature above normal. Therefore no matter how long the charging current is applied to the battery, excessive gasing at the negative electrodes or excessive heat which would bring about buckling of the plates of the battery, cannot take place. This effect is augmented greatly by that feature of my method of charging which consists in the application of a pulsating current, the pulses of which are separated by time intervals of appreciable length. Thus the maximum current may be made quite high, but owing to the time interval between pulses, the battery recovers itself before its temperature rises substantially above its normal operating temperature. This maximum value is maintained substantially uniform irrespective of the condition of the battery, since the coil $c$ of the regulator is a current coil.

Obviously in the practice of my method as aforesaid, the battery B may be retained continuously in connection with the generator without any attention whatsoever on the part of the operator of the vehicle in connection with which it is used. When discharged for any purpose, whether greatly as in starting the engine, or slightly as when used for lighting, its discharging commences immediately, and the application of the charging current is continued as long as the vehicle is in operation. This length of time may be four or five times as long as is necessary to again fully charge the battery, but the charging current is not removed from the battery at any time except when the voltage of the generator is too low to charge the battery.

Irrespective of the extreme variations of speed of the generator which occur in the use of a motor-cycle, the regulator R keeps the maximum value of the current at the same determinate value, the only effect of spurts and other variations of speed being to slightly increase the number of current impulses produced through the oscillations of the contact 6. During this time the actual variation of generator voltage is insufficient to be detrimental to good operation of lights or other load on the battery.

There is no further apparatus needed than that illustrated to carry out this method and yet with this small quantity of apparatus, the results are secured just as reliably as they are secured under the eye and hand of an expert in a charging station equipped with complicated apparatus.

Through the simple provision of the extra series coil $c'$ in connection with the potential coil $p$, reverse current in conductor C is effective to open conductor C at contacts 2, 3 and prevent discharge of the battery through the generator when the generator is idle. The generator is operated from the battery as a motor by a circuit closing switch in conductor D.

I am aware that batteries have heretofore been charged by maintaining the charging current at a substantially constant value during the charging period, and I make no claim thereto. My invention goes farther and fixes both the character and the value of the current with respect to the capacity of radiation of the battery being charged and its normal operating temperature, and irrespective of its condition of charge.

While I have disclosed the best form of my invention now known to me, I desire to have it understood that the method of my invention may be variously carried out without departing in any way from its generic spirit and I desire to cover in the annexed claims all such variations.

Having thus described my invention what I claim and desire to secure by Letters Patent is—

1. The method of charging and maintaining charged a storage battery which consists in applying to said battery for an indeterminate time and irrespective of the condition of charge, a charging current of pulsating character, the maximum of which is of a determinate substantially uniform value and unaffected by the condition of charge of the battery, the total of said current for any given period of time being of such small quantity that the temperature of the battery is not raised above normal when the charging current is continued after the battery has become fully charged.

2. The method of charging secondary batteries and maintaining the same charged which consists in applying for an indeterminate period of time and irrespective of the condition of charge a charging current of a pulsating character, the maximum of which is of a determinate substantially uniform value unaffected by the condition of charge of the battery, the total quantity of such current in any given period being such that gasing at the negative electrodes is not produced when the current is continued after the battery has become fully charged.

3. The method of charging secondary batteries and maintaining the same in charged condition, which consists in applying for an indeterminate period of time irrespective of the condition of charge of the battery charging current of a pulsating character, the pulses of which are separated by an appreciable interval of time, and the total quantity of which in any given period of time is insufficient to produce harmful effect upon the battery when the current is continued after the battery has become fully charged.

In testimony whereof, I affix my signature, in the presence of two witnesses.

EDWARD B. JACOBSON.

Witnesses:
 CHARLES L. STURTEVANT,
 JOHN D. STEPHENS.